(12) United States Patent
Lim

(10) Patent No.: US 11,027,727 B2
(45) Date of Patent: Jun. 8, 2021

(54) APPARATUS FOR RESPONDING TO VEHICLE WATER SPLASHING, SYSTEM HAVING THE SAME AND METHOD THEREOF

(71) Applicants: HYUNDAI MOTOR COMPANY, Seoul (KR); KIA MOTORS CORPORATION, Seoul (KR)

(72) Inventor: Jung Ho Lim, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 93 days.

(21) Appl. No.: 16/232,906

(22) Filed: Dec. 26, 2018

(65) Prior Publication Data

US 2020/0114908 A1 Apr. 16, 2020

(30) Foreign Application Priority Data

Oct. 16, 2018 (KR) ........................ 10-2018-0123047

(51) Int. Cl.
| | |
|---|---|
| *B60W 30/09* | (2012.01) |
| *B60W 10/04* | (2006.01) |
| *B60W 10/18* | (2012.01) |
| *B60W 10/20* | (2006.01) |
| *B60Q 9/00* | (2006.01) |
| *G06K 9/00* | (2006.01) |
| *B62D 15/02* | (2006.01) |

(52) U.S. Cl.
CPC ............... *B60W 30/09* (2013.01); *B60Q 9/00* (2013.01); *B60W 10/04* (2013.01); *B60W 10/18* (2013.01); *B60W 10/20* (2013.01); *G06K 9/00791* (2013.01); *B60W 2420/42* (2013.01); *B60W 2552/00* (2020.02); *B60W 2554/80* (2020.02); *B60W 2555/20* (2020.02); *B60W 2710/06* (2013.01); *B60W 2710/18* (2013.01); *B60W 2710/20* (2013.01); *B60W 2756/10* (2020.02); *B62D 15/0265* (2013.01)

(58) Field of Classification Search
CPC .................................................. G06K 9/00791
See application file for complete search history.

(56) References Cited

U.S. PATENT DOCUMENTS

| | | | | |
|---|---|---|---|---|
| 2015/0224925 | A1* | 8/2015 | Hartmann | .......... G06K 9/00791 348/148 |
| 2016/0167668 | A1* | 6/2016 | Prokhorov | ...... B60W 30/18009 701/23 |
| 2017/0161573 | A1* | 6/2017 | Zhao | ................... G06K 9/00798 |
| 2018/0022278 | A1* | 1/2018 | Parat | ......................... B60R 1/00 348/148 |
| 2018/0060676 | A1* | 3/2018 | Hartmann | .......... G06K 9/00805 |

* cited by examiner

*Primary Examiner* — Imran K Mustafa
(74) *Attorney, Agent, or Firm* — Lempia Summerfield Katz LLC

(57) ABSTRACT

An apparatus for responding to vehicle water splashing includes a processor determining the vehicle water splashing based on image data of a nearby vehicle and determining dangerousness caused by the vehicle water splashing to perform vehicle control and storage storing information determined by the processor and the image data of the nearby vehicle.

15 Claims, 8 Drawing Sheets

APPARATUS FOR RESPONDING TO VEHICLE WATER SPLASHING, SYSTEM HAVING THE SAME AND METHOD THEREOF

CROSS-REFERENCE TO RELATED APPLICATION

This application is claims the benefit of priority to Korean Patent Application No. 10-2018-0123047, filed in the Korean Intellectual Property Office on Oct. 16, 2018, the entire contents of which are incorporated herein by reference.

TECHNICAL FIELD

The present disclosure relates to an apparatus for responding to vehicle water splashing.

BACKGROUND

In recent years, vehicle automation/intelligence technologies such as a driver assistance system, a collision warning system, and an automatic temperature control system have been rapidly developing. In addition, the technologies to control the operating speed of a wiper or to control an engine or brake depending on weather and road conditions when a vehicle is driving have also been developed.

However, water in a puddle on the road surface splashes as a vehicle passes, and then the water splashes on the front of the windshield of the vehicle, when the vehicle is driving in a state where the rain is heavy. Accordingly, a driver may not see the front view of the vehicle instantaneously.

In this way, the driver's vehicle may collide with a nearby obstacle by a sudden steering operation or may collide with the rear vehicle due to sudden braking, when the driver cannot see the front view of the vehicle. Furthermore, the vehicle may collide with the front vehicle when the safety distance to the front vehicle is not assured. In addition, the water splashing that occurs on a specific road surface will continuously occur at the following vehicles driving on the specific road.

The disclosure of this section is to provide background of the invention. Applicant notes that this section may contain information available before this application. However, by providing this section, Applicant does not admit that any information contained in this section constitutes prior art.

SUMMARY

An aspect of the present disclosure provides an apparatus for responding to vehicle water splashing, a system having the same, and a method thereof that predict and determine the water splashing on the windshield of the vehicle based on the camera deep learning manner and actively respond to the water splashing.

According to an aspect of the present disclosure, an apparatus for responding to vehicle water splashing may include a processor determining the vehicle water splashing based on image data of a nearby vehicle and determining dangerousness due to the vehicle water splashing to perform vehicle control and storage storing information determined by the processor and the image data of the nearby vehicle.

According to an embodiment, the apparatus may further include a communication device transmitting and receiving information indicating that the vehicle water splashing occurs, to and from the nearby vehicle.

According to an embodiment, the processor may be configured to extract a waveform of the vehicle water splashing occurring when a front vehicle is driving, based on image data of the front vehicle among the nearby vehicle.

According to an embodiment, the processor may be configured to determine the dangerousness based on at least one or more of vehicle speed, a distance between a present vehicle and a point at which water splashing of the front vehicle occurs, a height of the waveform of the vehicle water splashing, or a spreading width of the waveform of the vehicle water splashing.

According to an embodiment, the processor may be configured to operate a learning network that learns the vehicle water splashing, based on the image data of the front vehicle.

According to an embodiment, the processor may be configured to input the image data of the front vehicle obtained in vehicle driving, to the learning network to determine the vehicle water splashing and to determine the dangerousness.

According to an embodiment, the processor may be configured to control vehicle driving to be continued, when the result of determining the dangerousness indicates that the dangerousness is lower than a predetermined level.

According to an embodiment, when the result of determining the dangerousness indicates that the dangerousness is high and the present vehicle is scheduled to drive at a point at which the vehicle water splashing occurs, the processor may be configured to output a warning sound or a warning text, to provide a vehicle path for avoiding the point at which the vehicle water splashing occurs, or to transmit danger information due to the vehicle water splashing to the nearby vehicle.

According to an embodiment, when the result of determining the dangerousness indicates that the dangerousness is high and the present vehicle is driving at a point at which the vehicle water splashing occurs, the processor may be configured to output a vehicle control message for providing a notification of performing automatic vehicle control and to perform the vehicle control for avoiding the dangerousness due to the vehicle water splashing.

According to an embodiment, when the result of determining the dangerousness indicates that the dangerousness is high and the present vehicle is driving at the point at which the vehicle water splashing occurs, the processor may be configured to transmit danger information due to the vehicle water splashing to the nearby vehicle.

According to an aspect of the present disclosure, a vehicle system may include a sensor module obtaining image data and driving information of a nearby vehicle and an apparatus for responding to vehicle water splashing determining the vehicle water splashing based on the image data of the nearby vehicle and determining dangerousness caused by the vehicle water splashing to perform vehicle control.

According to an embodiment, the apparatus for responding to the vehicle water splashing may be configured to extract a waveform of the vehicle water splashing occurring when a front vehicle is driving, based on image data of the front vehicle among the nearby vehicle.

According to an embodiment, the apparatus for responding to the vehicle water splashing may be configured to determine the dangerousness based on at least one or more of vehicle speed, a distance between a present vehicle and a point at which water splashing of the front vehicle occurs, a height of the waveform of the vehicle water splashing, or a spreading width of the waveform of the vehicle water splashing.

According to an embodiment, the apparatus for responding to the vehicle water splashing may include a learning network that learns the vehicle water splashing, based on the image data of the front vehicle, and the apparatus for responding to the vehicle water splashing may be configured to input the image data of the front vehicle obtained in vehicle driving, to the learning network to determine the vehicle water splashing and to determine the dangerousness.

According to an embodiment, the apparatus for responding to the vehicle water splashing may be configured to control vehicle driving to be continued, when the result of determining the dangerousness indicates that the dangerousness is lower than a predetermined level. When the dangerousness is high and a present vehicle is scheduled to drive at a point at which the vehicle water splashing occurs, the apparatus for responding to the vehicle water splashing may be configured to output a warning sound or a warning text, to provide a vehicle path for avoiding the point at which the vehicle water splashing occurs, or to transmit danger information due to the vehicle water splashing to the nearby vehicle.

According to an embodiment, when the result of determining the dangerousness indicates that the dangerousness is high and the present vehicle is driving at the point at which the vehicle water splashing occurs, the apparatus for responding to the vehicle water splashing may be configured to output a vehicle control message for providing a notification of performing automatic vehicle control, to perform the vehicle control for avoiding the dangerousness due to the vehicle water splashing, and to transmit the danger information due to the vehicle water splashing to the nearby vehicle.

According to an aspect of the present disclosure, a method for responding to vehicle water splashing may include obtaining image data and driving information of a nearby vehicle, determining the vehicle water splashing based on the image data of the nearby vehicle, and determining dangerousness caused by the vehicle water splashing to perform vehicle control.

According to an embodiment, the determining of the vehicle water splashing may include extracting a waveform of the vehicle water splashing occurring when a front vehicle is driving, based on image data of the front vehicle among the nearby vehicle.

According to an embodiment, the determining of the vehicle water splashing may include determining the dangerousness based on at least one or more of vehicle speed, a distance between a present vehicle and a point at which water splashing of the front vehicle occurs, a height of the waveform of the vehicle water splashing, or a spreading width of the waveform of the vehicle water splashing.

According to an embodiment, the performing of the vehicle control may include controlling vehicle driving to be continued, when the result of determining the dangerousness indicates that the dangerousness is lower than a predetermined level. When the dangerousness is high and a present vehicle is scheduled to drive at the point at which the vehicle water splashing occurs, the performing of the vehicle control may include outputting a warning sound or a warning text, providing a vehicle path for avoiding the point at which the vehicle water splashing occurs, or transmitting danger information due to the vehicle water splashing to the nearby vehicle.

According to an embodiment, when the result of determining the dangerousness indicates that the dangerousness is high and the present vehicle is driving at the point at which the vehicle water splashing occurs, the performing of the vehicle control may include outputting a vehicle control message for providing a notification of performing automatic vehicle control, performing the vehicle control for avoiding the dangerousness due to the vehicle water splashing, and transmitting the danger information due the vehicle water splashing to the nearby vehicle.

BRIEF DESCRIPTION OF THE DRAWINGS

The above and other aspects, features and advantages of the present disclosure will be more apparent from the following detailed description taken in conjunction with the accompanying drawings.

DETAILED DESCRIPTION

Figure 1:
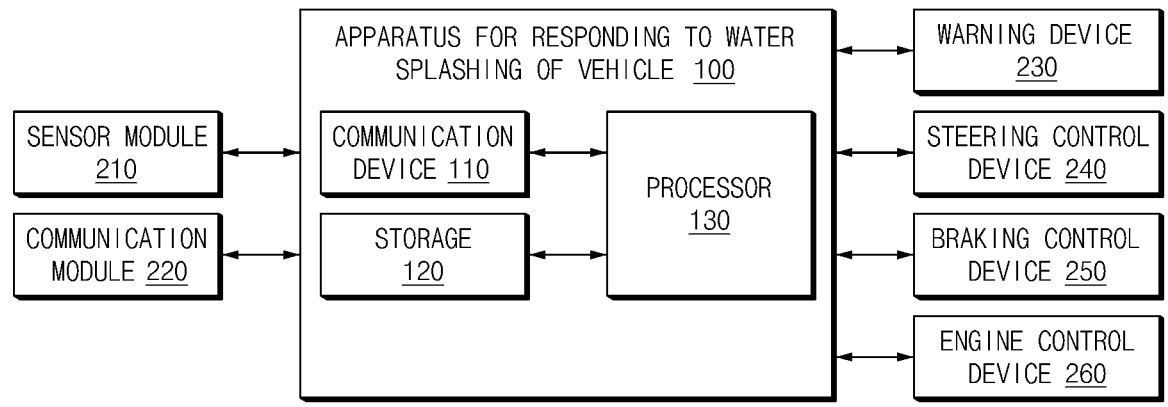
FIG. 1 is a block diagram illustrating a configuration of a vehicle system including an apparatus for responding to vehicle water splashing, according to an embodiment of the present disclosure.

Hereinafter, embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of embodiments of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

The present disclosure disclose a technology that tracks image data of vehicle water splashing of a nearby vehicle, learns dangerousness for each water splashing waveform based on a learning algorithm by using the accumulated data, determines or estimates dangerousness or degree of danger caused by the current water splashing, depending on the dangerousness for each water splashing waveform when a vehicle is driving actually, and makes it possible to respond to the dangerousness.

Below, various embodiments of the present disclosure will be described in detail with reference to FIGS. 1 to 8.

Figure 2:
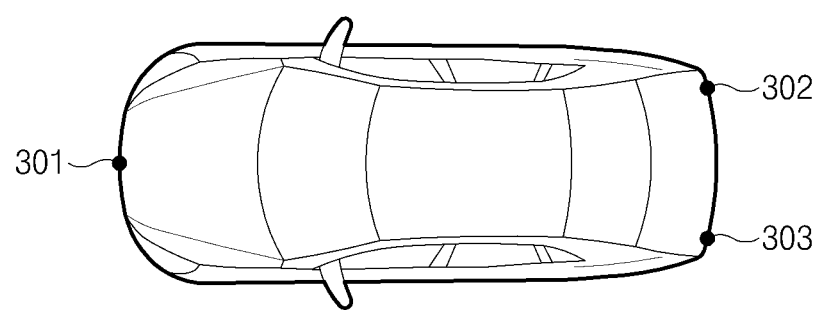
FIG. 2 is a view in which a sensor module is mounted in a vehicle, according to an embodiment of the present disclosure.

FIG. 1 is a block diagram of a vehicle system including an apparatus for responding to vehicle water splashing, according to an embodiment of the present disclosure. FIG. 2 is a view in which a sensor module is mounted in a vehicle, according to an embodiment of the present disclosure.

Referring to FIG. 1, a vehicle system may include an apparatus 100 for responding to vehicle water splashing, a sensor module 210, a communication module 220, a warning device 230, a steering control device 240, a braking control device 250, and an engine control device 260. At this time, each of the components of the vehicle system including the apparatus 100 for responding to vehicle water splashing may be mounted in the vehicle.

The apparatus 100 for responding to vehicle water splashing may learn the vehicle water splashing through a learning algorithm (Convolutional Neural Network (CNN)) based on image data of a nearby vehicle, may accurately determine the vehicle water splashing based on the learning result when the vehicle drives later, may determine the dangerousness caused by the vehicle water splashing, and may perform vehicle control and warning so as to avoid the dangerous situation.

To this end, the apparatus 100 for responding to vehicle water splashing may include a communication device 110, storage 120, and a processor 130.

The communication device 110 may be a hardware device implemented with various electronic circuits for transmitting and receiving signals via a wireless or wired connection; in embodiments, the communication device 110 may perform communication in a vehicle over CAN communication, or the like.

The storage 120 may store information (e.g., image data) obtained from the sensor module 210, data on which deep learning is performed by the processor 130, or the like. The storage 120 may include at least one type of a storage medium among a flash memory type of a memory, a hard disk type of a memory, a micro type of a memory, and a card type (e.g., a Secure Digital (SD) card or an eXtream Digital (XD) Card) of a memory, a Random Access Memory (RAM) type of a memory, a Static RAM (SRAM) type of a memory, a Read-Only Memory (ROM) type of a memory, a Programmable ROM (PROM) type of a memory, an Electrically Erasable PROM (EEPROM) type of a memory, an Magnetic RAM (MRAM) type of a memory, a magnetic disk type of a memory, and an optical disc type of a memory.

The processor 130 may be electrically connected to the communication device 110 and the storage 120, may electrically control each of the components, may be an electrical circuit that executes the commands of the software, and may perform various data processing and calculation described below. For example, the processor 130 may be an electronic control unit (ECU) or a sub-controller, which is mounted in the vehicle.

The processor 130 may extract the waveform of the vehicle water splashing occurring when the front vehicle is driving, based on the image data of the front vehicle obtained through the sensor module 210.

The processor 130 may determine or calculate the dangerousness based on at least one or more of the speed of the vehicle, a distance between the present vehicle and a point at which the water splashing of the front vehicle occurs, the height of the waveform of the vehicle water splashing, or the spreading width of the waveform of the vehicle water splashing.

The processor 130 may operate a learning algorithm (learning network) that learns the vehicle water splashing based on the image data of the front vehicle obtained through the sensor module 210, may input the image data of the front vehicle, which is obtained when the vehicle is driving, to the learning network, may determine the vehicle water splashing, and may determine the dangerousness. The learning network may generate dangerousness information according to the waveform of the vehicle water splashing based on the learned algorithm.

The processor 130 may allow the vehicle to continuously drive without a separate warning or action, when the result of determining the dangerousness indicates that the dangerousness is lower than a predetermined level; the processor 130 may perform a warning or vehicle control, when the result of determining the dangerousness indicates that the dangerousness is higher than a predetermined level.

The processor 130 may output a warning sound or warning text, may provide a vehicle path for avoiding a point at which the vehicle water splashing occurs, or may transmit danger information due to the vehicle water splashing, to a nearby vehicle, when the dangerousness is higher than a predetermined level and the present vehicle is scheduled to drive at a point at which the vehicle water splashing occurs. Alternatively, the processor 130 may output a warning sound or warning text, may provide a vehicle path for avoiding a point at which the vehicle water splashing occurs, and may transmit danger information due to the vehicle water splashing, to a nearby vehicle, when the dangerousness is higher than a predetermined level and the present vehicle is scheduled to drive at a point at which the vehicle water splashing occurs.

The processor 130 may output a vehicle control message for providing a notification that the vehicle is automatically controlled, may perform vehicle control for avoiding the dangerousness due to the vehicle water splashing, and may transmit danger information due to the vehicle water splashing to a nearby vehicle to share the danger information with the nearby vehicle, when the result of determining the dangerousness indicates that the dangerousness is higher than a predetermined level and the present vehicle is driving at a point at which the vehicle water splashing occurs.

The nearby vehicle may rapidly respond to the vehicle water splashing, by sharing information and dangerousness associated with a point at which the vehicle water splashing occurs, with a nearby vehicle.

The sensor module 210 may obtain image data at a periphery of a vehicle, may detect an object at a periphery of the vehicle to obtain detection information, and may transmit the obtained information to the apparatus 100 for responding to vehicle water splashing over CAN communication. That is, the sensor module 210 may be configured to sense information about nearby objects (e.g., a vehicle, a pedestrian, a bicycle, a motorcycle, or the like). The sensor module 210 may sense various pieces of information such as the location, speed and acceleration, direction, type, or the like of an external object. To this end, the sensor module 210 may include a camera, radar, a laser scanner, corner radar, an acceleration sensor, a yaw rate sensor, a torque measurement sensor, and/or a wheel speed sensor.

The sensor module 210 may include at least one or more sensor modules, and the at least one or more sensor modules may be mounted in the vehicle; the sensor module 210 may be installed on the front, side, or rear of the vehicle. FIG. 2 illustrates an example in which radars 301, 302, and 303 are mounted on the front side and both rear sides of the vehicle. At this time, the camera may include an MFC camera, a SVM camera, or the like.

The communication module 220 may communicate with nearby vehicles or peripheral communication devices and may perform wireless communication. The communication module 220 may perform V2X or V2V communication and may perform wireless communication. The communication module 220 may transmit and receive vehicle driving information, danger information, or the like to and from nearby vehicles to share the vehicle driving information, the danger information, or the like.

The warning device 230 may perform a warning such as notification of a dangerous situation due to the vehicle water splashing, or the like. The warning device 230 may have a configuration for performing visual, auditory, and tactile warnings, and may be implemented as a head-up display (HUD), a cluster, Audio Video Navigation (AVN), or the like.

The steering control device 240 may be configured to control the steering angle of the vehicle and may include a steering wheel, an actuator operating in conjunction with the steering wheel, and a controller for controlling the actuator.

The braking control device 250 may be configured to control the brake of the vehicle and may include a controller for controlling a brake.

The engine control device 260 may be configured to control the driving of the engine of a vehicle and may include a controller for controlling the speed of the vehicle.

As such, after learning the vehicle water splashing through a camera deep learning method (CNN), the water splashing image may be recognized or determined while the vehicle is driving, may determine the dangerousness in advance, and may respond to the dangerousness. Embodiments may implement a warning message, may induce vehicle path avoidance, and may share danger information with nearby vehicles, as a primary countermeasure. Furthermore, in embodiments, as a secondary countermeasure, a controller or other device of the vehicle may output a text message or voice message saying that the vehicle is autonomously controlled, may perform steering wheel steering, engine drive control, and brake control so as to identify nearby obstacles and to avoid the collision with nearby obstacles, and may transmit danger information to nearby vehicles to share the danger information with nearby vehicles, when the water splashing actually occurs.

Figure 3:
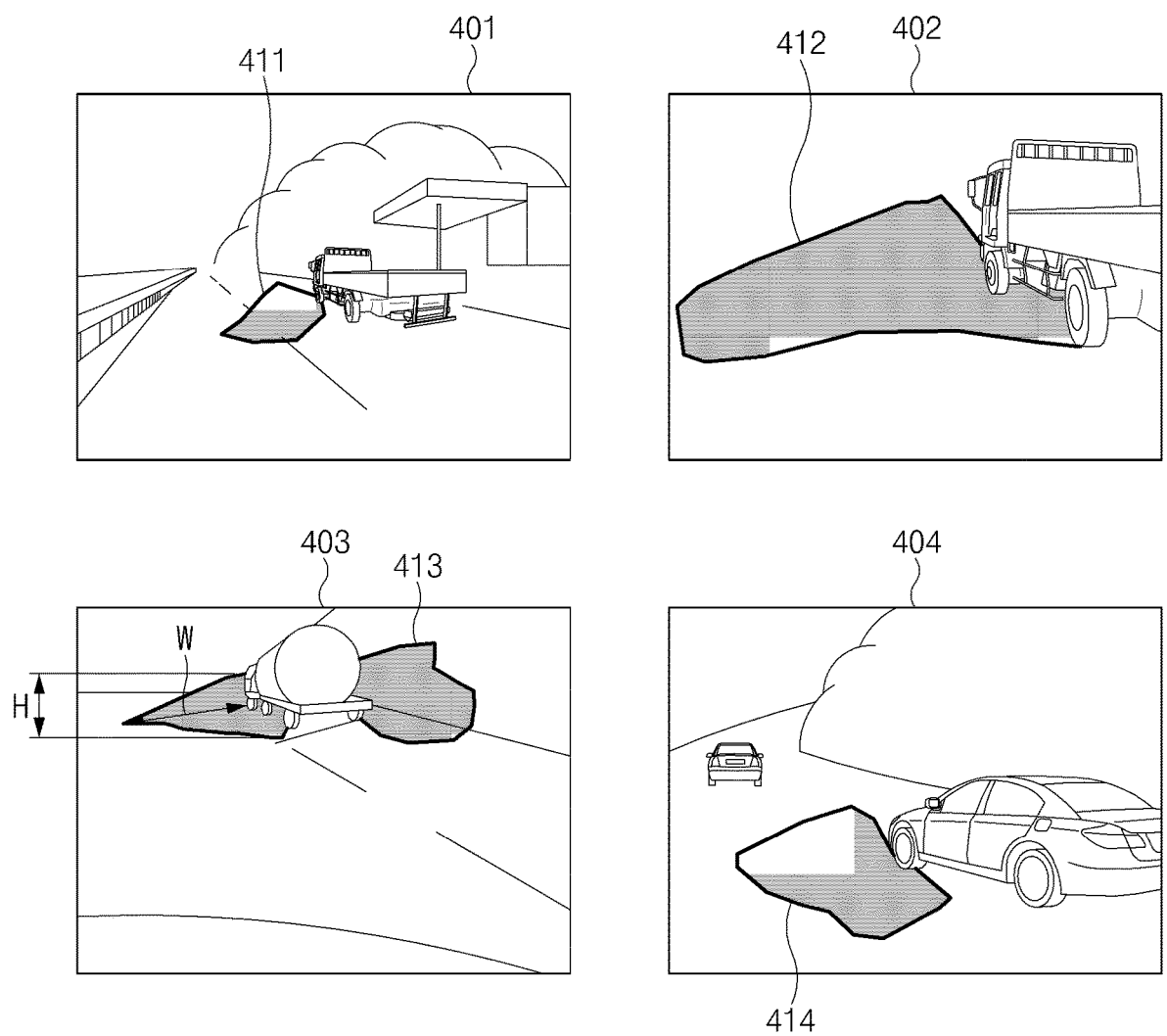
FIG. 3 is a view of waveforms of various pieces of vehicle water splashing, according to an embodiment of the present disclosure.

FIG. 3 is a view of waveforms of various pieces of vehicle water splashing, according to an embodiment of the present disclosure. Referring to a water splashing image of a vehicle in 401, 402, 403, and 404 of FIG. 3, water splashing waveforms 411, 412, 413, and 414 occurring while a front vehicle is driving may be extracted. At this time, the apparatus 100 for responding to vehicle water splashing may determine dangerousness depending on the sizes of the water splashing waveforms 411, 412, 413, and 414.

Figure 4:
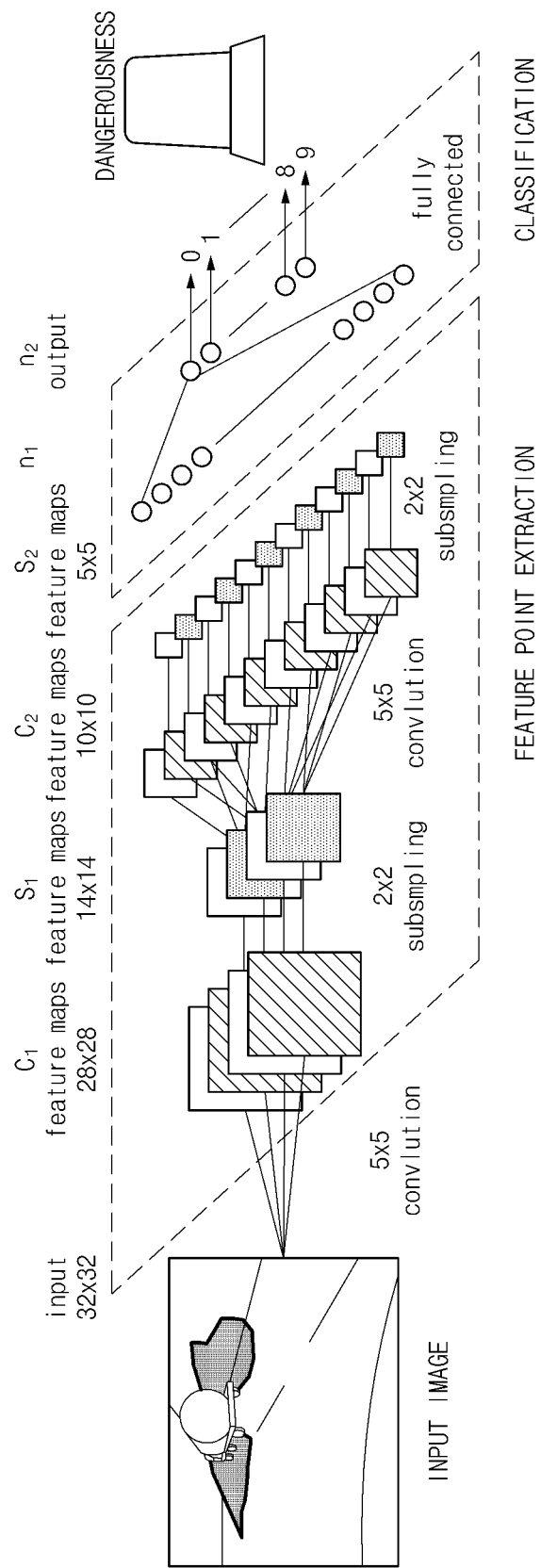
FIG. 4 is a view for describing a deep learning method using a water splashing waveform of a vehicle, according to an embodiment of the present disclosure.

FIG. 4 is a view for describing a deep learning method using a water splashing waveform of a vehicle, according to an embodiment of the present disclosure. Referring to FIG. 4, the apparatus 100 for responding to vehicle water splashing may input water splashing waveform information extracted in FIG. 3 to a learning network. After extracting a feature point, the apparatus 100 for responding to vehicle water splashing may perform classification based on the extracted feature point. For example, as illustrated in 413 of FIG. 3, the dangerousness may be classified depending on a height H and a spreading width W of the water splashing waveform of a vehicle. When the height and spreading width of the water splashing waveform 412 of a vehicle are very great or greater than a predetermined height and a predetermined width, the water splashing waveform 412 may be classified as the high dangerousness. When the spreading width of the water splashing waveform 411 of a vehicle are very small or smaller than a predetermined width, the water splashing waveform 411 may be classified as the low dangerousness.

Figure 5:
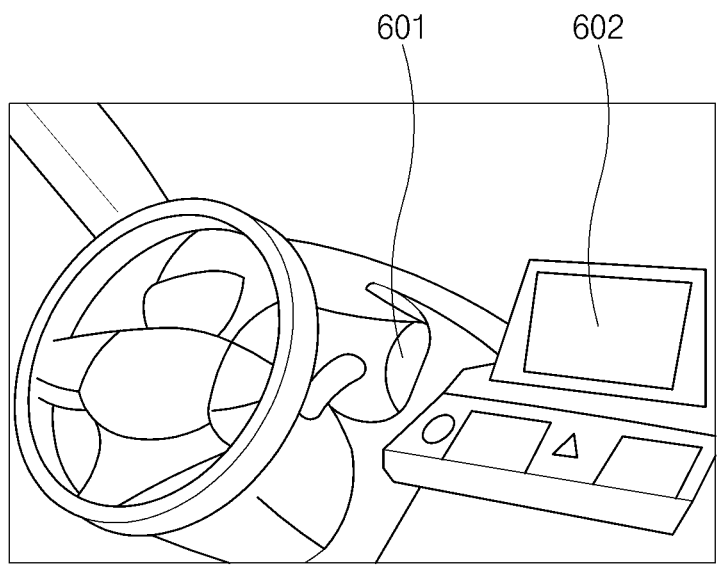
FIG. 5 is a view of a warning output according to dangerousness of vehicle water splashing, according to an embodiment of the present disclosure.

FIG. 5 is a view of a warning output according to dangerousness of vehicle water splashing, according to an embodiment of the present disclosure. Referring to FIG. 5, the apparatus 100 for responding to vehicle water splashing may output a warning message through a cluster 601 and an AVN 602, when it is determined that dangerousness is higher than a predetermined level, based on the vehicle water splashing waveform of the current front vehicle.

Figure 6:
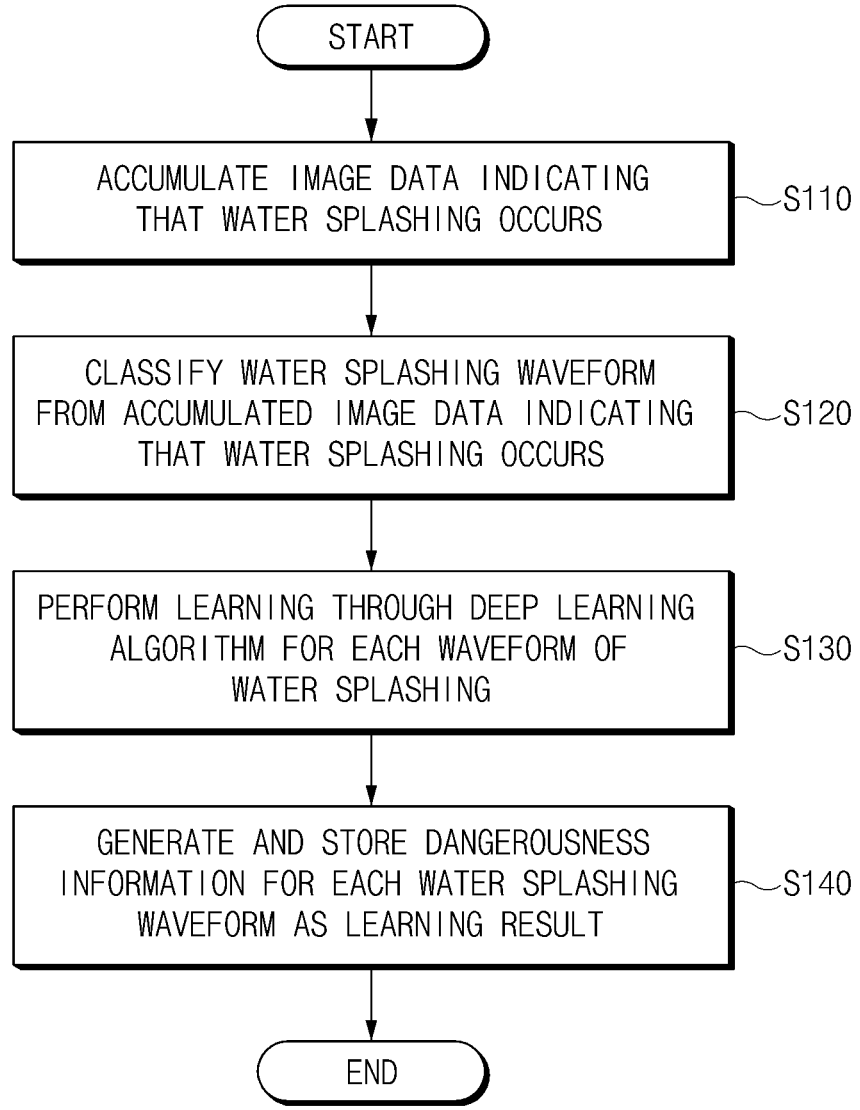
FIG. 6 is a flowchart for describing a learning method according to a water splashing waveform of a vehicle, according to an embodiment of the present disclosure.

Hereinafter, according to an embodiment of the present disclosure, a learning method according to a water splashing waveform of a vehicle will be described with reference to FIG. 6. FIG. 6 is a flowchart for describing a learning method according to a water splashing waveform of a vehicle, according to an embodiment of the present disclosure.

Hereinafter, it is assumed that the apparatus 100 for responding to vehicle water splashing of FIG. 1 performs the process of FIG. 6. In addition, as described in FIG. 6, it is understood that the operation described as being executed by the apparatus 100 is controlled by the processor 130 of the apparatus 100.

Referring to FIG. 6, in operation 5110, the apparatus 100 for responding to vehicle water splashing accumulates data associated with the vehicle water splashing of image data received from the sensor module 210. At this time, the sensor module 210 may transmit the image data to the apparatus 100 for responding to vehicle water splashing at a predetermined period or may provide the image data whenever an event (e.g., when it rains) occurs.

Afterward, in operation 5120, the apparatus 100 for responding to vehicle water splashing classifies a water splashing waveform from the accumulated image data indicating that the vehicle water splashing occurs; in operation 5130, the apparatus 100 for responding to vehicle water splashing performs learning through a deep learning algorithm for each waveform of water splashing.

As such, in operation 5140, the apparatus 100 for responding to vehicle water splashing generates and stores dangerousness information for each water splashing waveform as the learning result.

Figure 7:
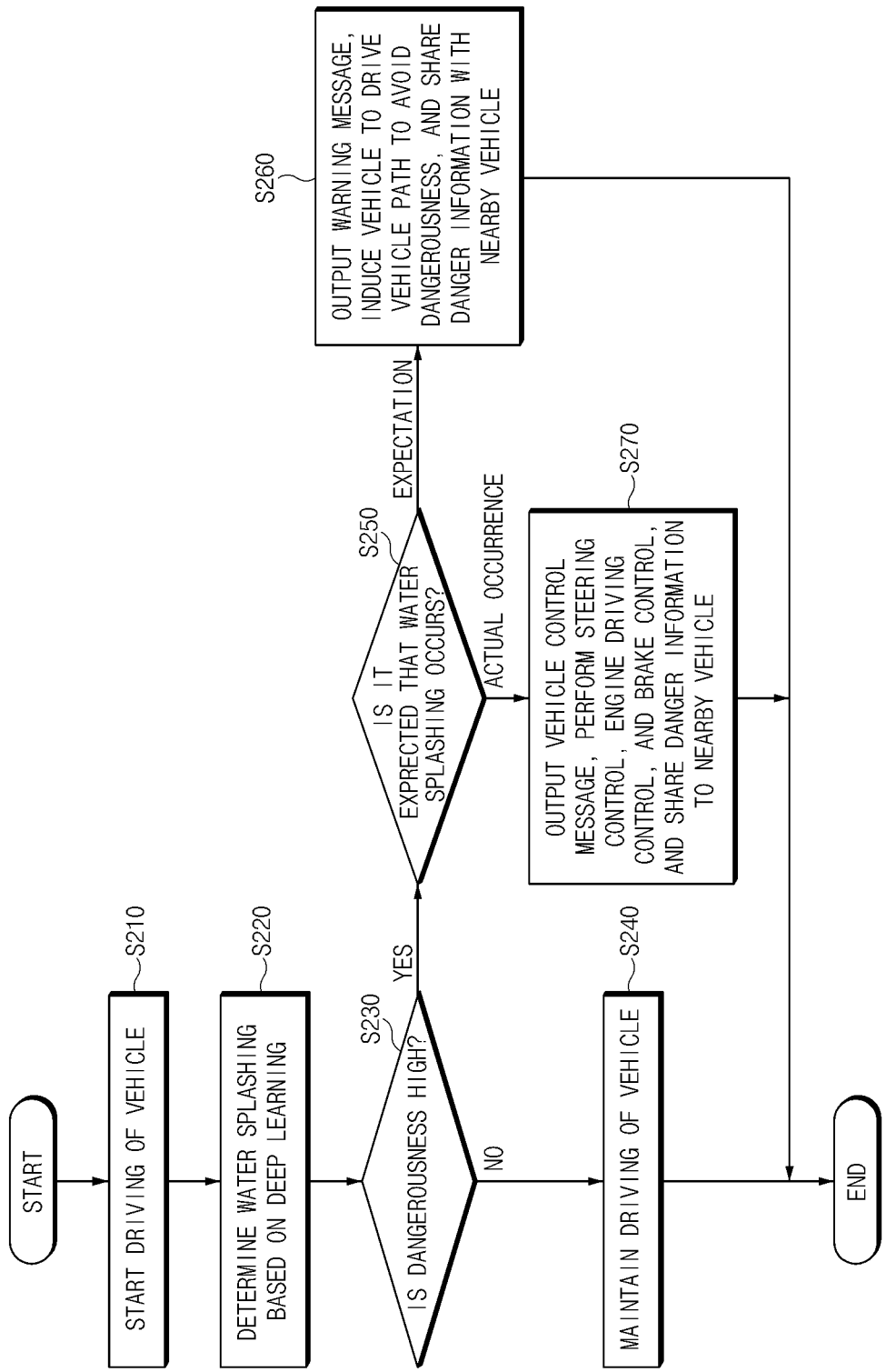
FIG. 7 is a flowchart for describing a method for responding to the vehicle water splashing, according to an embodiment of the present disclosure.

Hereinafter, according to an embodiment of the present disclosure, a method for responding to vehicle water splashing will be described with reference to FIG. 7. FIG. 7 is a flowchart for describing a method for responding to vehicle water splashing, according to an embodiment of the present disclosure. Hereinafter, it is assumed that the apparatus 100 for responding to vehicle water splashing of FIG. 1 performs the process of FIG. 7. In addition, as described in FIG. 7, it is understood that the operation described as being executed by the apparatus 100 is controlled by the processor 130 of the apparatus 100.

Referring to FIG. 7, after starting the driving of a vehicle in operation 5210, in operation 5220, the apparatus 100 for responding to vehicle water splashing may determine whether the vehicle water splashing occurs, based on deep learning by applying the obtained image data to a learning algorithm. At this time, the apparatus 100 for responding to vehicle water splashing may determine whether the vehicle water splashing occurs, by using the speed at which the vehicle is moving, a distance between the present vehicle and a point at which the water splashing occurs, the height of the water splashing occurring by the front vehicle, the degree of horizontal spreading of the water splashing, the waveform of the water splashing, or the like.

In operation 5230, the apparatus 100 for responding to vehicle water splashing determines the dangerousness or degree of danger that is to be caused by the vehicle water splashing, when the vehicle water splashing occurs. That is, the apparatus 100 for responding to vehicle water splashing may determine that the dangerousness due to the vehicle water splashing is higher than a predetermined level, when the blind phenomenon occurs in front of the vehicle due to the vehicle water splashing or when there are obstacles, which can cause collisions, at a periphery of the vehicle.

In operation 5240, the apparatus 100 for responding to vehicle water splashing maintains the driving of the vehicle, when it is determined that the dangerousness or a degree of danger is lower than a predetermined level; in operation 5250, the apparatus 100 for responding to vehicle water splashing determines whether the vehicle water splashing is scheduled to occur, when it is determined that the dangerousness is higher than a predetermined level.

In operation 5260, the apparatus 100 for responding to vehicle water splashing outputs a warning message, induces the vehicle to drive a vehicle path such that the vehicle water splashing does not occur, transmits danger information to a nearby vehicle, and shares the danger information with the nearby vehicle, when the vehicle water splashing is scheduled to occur. For example, the apparatus 100 for responding to vehicle water splashing outputs a warning message in advance, induces the vehicle to drive on a vehicle path such that the vehicle avoids a point at which it is expected that the vehicle water splashing occurs, transmits the point at which it is expected that the vehicle water splashing occurs, to nearby vehicles, and shares the point with the nearby vehicles, when a vehicle speed is not greater than 60 km/h and the point at which it is expected that the vehicle water splashing occurs is a 80 m ahead. Accordingly, the apparatus 100 for responding to vehicle water splashing may allow the following vehicles to drive while avoiding the point at which it is expected that the vehicle water splashing occurs.

In the meantime, in operation 5270, the apparatus 100 for responding to vehicle water splashing outputs a vehicle control message saying that the vehicle is controlled to avoid the dangerous situation, to notify a user, performs steering control, engine driving control, and brake control to avoid the collision, transmits danger information to a nearby vehicle, and shares the danger information to the nearby vehicle, when the vehicle water splashing occurs currently. That is, the apparatus 100 for responding to vehicle water splashing may perform vehicle control so as to prevent a secondary accident, may output a vehicle control message to notify a user before performing the vehicle control or at the same time, may avoid the collision or may prevent the sudden brake, or the like by performing the vehicle control, and may allow the vehicle to drive at a safe distance from the front vehicle, when the vehicle water splashing currently occurs in the present vehicle. In addition, the apparatus 100 for responding to vehicle water splashing may notify a nearby vehicle (the following vehicle) of a point at which the water splashing occurs in the present vehicle to allow the nearby vehicle to drive while the nearby vehicle avoids the point at which the water splashing occurs.

As such, in case of rain, a controller or other device of the vehicle may determine or estimate the vehicle water splashing, may provide a warning, and may perform vehicle control so as to provide an avoidance path or to prevent the collision, and thus it is possible to drive a vehicle safely.

Figure 8:
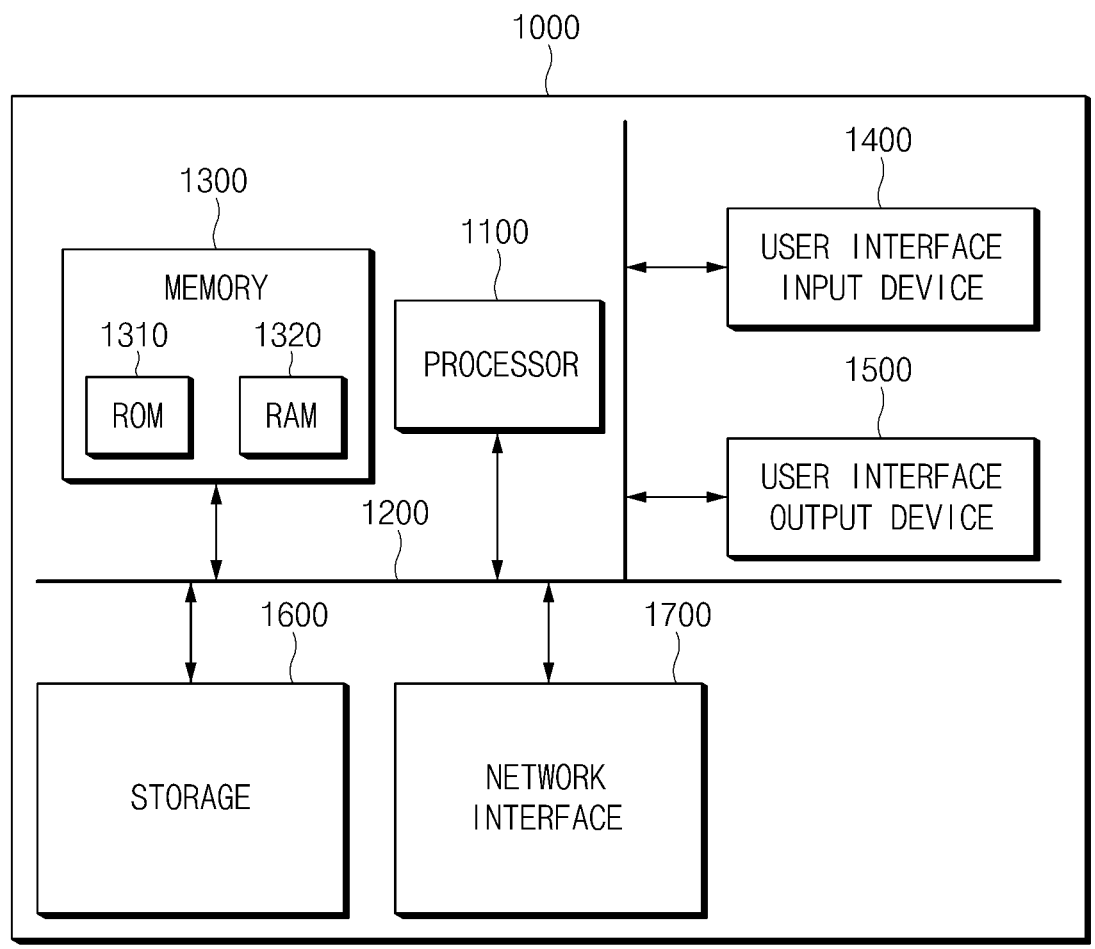
FIG. 8 illustrates a computing system according to an embodiment of the present disclosure.

FIG. 8 illustrates a computing system according to an embodiment of the present disclosure.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component in the user terminal.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

According to embodiments, the vehicle may predict and respond to the vehicle water splashing to increase the reliability of the vehicle system and to allow a user to drive the vehicle safely, thereby enhancing the user's convenience.

In addition, the ego vehicle may share information about the vehicle water splashing with other vehicles, thereby increasing a safe driving effect during autonomous driving.

Besides, a variety of effects directly or indirectly understood through this disclosure may be provided.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for responding to vehicle water splashing, the apparatus comprising:
a processor, wherein the processor is configured to:
determine, based on image data of a nearby vehicle, whether vehicle water splashing occurs, and
determine dangerousness caused by the vehicle water splashing to perform vehicle control when the processor determines that the vehicle water splashing occurs; and
a storage configured to store information determined by the processor and the image data of the nearby vehicle,
wherein the processor is configured to:
accumulate image data of the vehicle water splashing of a front vehicle as the nearby vehicle;
extract a plurality of waveforms of the vehicle water splashing occurring when the front vehicle is driving, based on the accumulated image data of the front vehicle, each waveform of the plurality of waveforms of the vehicle water splashing representing a size or shape of splashing water caused by the front vehicle;
operate a learning network that learns the vehicle water splashing, based on the plurality of waveforms of the vehicle water splashing from the accumulated image data of the front vehicle, the operation of the learning network comprising generation and storage of dangerousness information for each waveform of the plurality of waveforms of the vehicle water splashing;
input a newly extracted waveform of the vehicle water splashing to the learning network;
output dangerousness information corresponding to the inputted newly extracted waveform as a learning result based on the stored dangerousness information;
determine whether the vehicle water splashing occurs based on the outputted dangerousness information; and
determine the dangerousness.

2. The apparatus of claim 1, further comprising:
a communication device configured to transmit and receive information indicating that the vehicle water splashing occurs, to and from the nearby vehicle.

3. The apparatus of claim 1, wherein the processor is configured to:
determine the dangerousness based on at least one or more of vehicle speed, a distance between a present vehicle and a point at which the vehicle water splashing of the front vehicle occurs, a height of the waveform of the vehicle water splashing, or a spreading width of the waveform of the vehicle water splashing.

4. The apparatus of claim 3, wherein the processor is configured to:
control vehicle driving to be continued, when the result of determining the dangerousness indicates that the dangerousness is lower than a predetermined level.

5. The apparatus of claim 3, wherein when the result of determining the dangerousness indicates that the dangerousness is higher than a predetermined level and the present vehicle is scheduled to drive at a point at which the vehicle water splashing occurs, the processor is configured to:
output a warning sound or a warning text;
provide a vehicle path for avoiding the point at which the vehicle water splashing occurs; or
transmit danger information due to the vehicle water splashing to the nearby vehicle.

6. The apparatus of claim 3, wherein when the result of determining the dangerousness indicates that the dangerousness is higher than a predetermined level and the present vehicle is driving at a point at which the vehicle water splashing occurs, the processor is configured to:
output a vehicle control message for providing a notification of performing automatic vehicle control; and
perform the vehicle control for avoiding the dangerousness due to the vehicle water splashing.

7. The apparatus of claim 6, wherein when the result of determining the dangerousness indicates that the dangerousness is higher than the predetermined level and the present vehicle is driving at the point at which the vehicle water splashing occurs, the processor is further configured to:
transmit danger information due to the vehicle water splashing to the nearby vehicle.

8. A vehicle system comprising:
at least a sensor module configured to obtain image data and driving information of a nearby vehicle; and
an apparatus for responding to vehicle water splashing, wherein the apparatus for responding to the vehicle water splashing is configured to:
determine, based on the image data of the nearby vehicle, whether vehicle water splashing occurs; and
determine dangerousness caused by the vehicle water splashing to perform vehicle control when the apparatus determines that the vehicle water splashing occurs,
wherein the apparatus for responding to the vehicle water splashing is further configured to accumulate image data of the vehicle water splashing of a front vehicle as the nearby vehicle and extract a plurality of waveforms of the vehicle water splashing occurring when the front vehicle is driving, based on the accumulated image data of the front vehicle, each waveform of the plurality of waveforms of the vehicle water splashing representing a size or shape of splashing water caused by the front vehicle,
wherein the apparatus for responding to the vehicle water splashing includes a learning network that learns the vehicle water splashing, based on the plurality of waveforms of the vehicle water splashing from the accumulated image data of the front vehicle, the learning network being configured to generate and store dangerousness information for each waveform of the plurality of waveforms of the vehicle water splashing, and
wherein the apparatus for responding to the vehicle water splashing is configured to:
input a newly extracted waveform of the vehicle water splashing to the learning network;

output dangerousness information corresponding to the inputted newly extracted waveform as a learning result based on the stored dangerousness information;

determine whether the vehicle water splashing occurs based on the outputted dangerousness information; and determine the dangerousness.

9. The vehicle system of claim 8, wherein the apparatus for responding to the vehicle water splashing is configured to:

determine the dangerousness based on at least one or more of vehicle speed, a distance between a present vehicle and a point at which the vehicle water splashing of the front vehicle occurs, a height of the waveform of the vehicle water splashing, or a spreading width of the waveform of the vehicle water splashing.

10. The vehicle system of claim 8, wherein the apparatus for responding to vehicle water splashing is configured to:

control vehicle driving to be continued, when the result of determining the dangerousness indicates that the dangerousness is lower than a predetermined level, and wherein when the dangerousness is higher than a predetermined level and a present vehicle is scheduled to drive at a point at which the vehicle water splashing occurs, the apparatus for responding to the vehicle water splashing is configured to:

output a warning sound or a warning text;

provide a vehicle path for avoiding the point at which the vehicle water splashing occurs; or transmit danger information due to the vehicle water splashing to the nearby vehicle.

11. The vehicle system of claim 10, wherein when the result of determining the dangerousness indicates that the dangerousness is higher than a predetermined level and the present vehicle is driving at the point at which the vehicle water splashing occurs, the apparatus for responding to the vehicle water splashing is configured to:

output a vehicle control message for providing a notification of performing automatic vehicle control;

perform the vehicle control for avoiding the dangerousness due to the vehicle water splashing; and transmit the danger information due to the vehicle water splashing to the nearby vehicle.

12. A method for responding to vehicle water splashing, the method comprising:

obtaining image data and driving information of a nearby vehicle;

determining, based on the image data of the nearby vehicle, whether vehicle water splashing occurs; and determining dangerousness caused by the vehicle water splashing to perform vehicle control when determining that the vehicle water splashing occurs, wherein the determining of the vehicle water splashing includes accumulating image data of the vehicle water splashing of a front vehicle as the nearby vehicle and extracting a plurality of waveforms of the vehicle water splashing occurring when the front vehicle is driving, based on the accumulated image data of the front vehicle, each waveform of the plurality of waveforms of the vehicle water splashing representing a size or shape of splashing water caused by the front vehicle, wherein the method for responding to the vehicle water splashing includes operating a learning network that learns the vehicle water splashing, based on the plurality of waveforms of the vehicle water splashing from the accumulated image data of the front vehicle, the learning network being configured to generate and store dangerousness information for each waveform of the plurality of waveforms of the vehicle water splashing, and wherein the determining of the dangerousness includes:

inputting a newly extracted waveform of the vehicle water splashing to the learning network;

outputting dangerousness information corresponding to the inputted newly extracted waveform as a learning result based on the stored dangerousness information;

determining whether the vehicle water splashing occurs based on the outputted dangerousness information; and determining the dangerousness.

13. The method of claim 12, wherein the determining of the vehicle water splashing includes:

determining the dangerousness based on at least one or more of vehicle speed, a distance between a present vehicle and a point at which water splashing of the front vehicle occurs, a height of the waveform of the vehicle water splashing, or a spreading width of the waveform of the vehicle water splashing.

14. The method of claim 12, wherein the performing of the vehicle control includes:

controlling vehicle driving to be continued, when the result of determining the dangerousness indicates that the dangerousness is lower than a predetermined level, and wherein the performing of the vehicle control includes:

when the dangerousness is higher than the predetermined level and a present vehicle is scheduled to drive at the point at which the vehicle water splashing occurs, outputting a warning sound or a warning text;

providing a vehicle path for avoiding the point at which the vehicle water splashing occurs; or transmitting danger information due to the vehicle water splashing to the nearby vehicle.

15. The method of claim 14, wherein when the result of determining the dangerousness indicates that the dangerousness is higher than the predetermined level and the present vehicle is driving at the point at which the vehicle water splashing occurs, the performing of the vehicle control includes:

outputting a vehicle control message for providing a notification of performing automatic vehicle control;

performing the vehicle control for avoiding the dangerousness due to the vehicle water splashing; and transmitting the danger information due the vehicle water splashing to the nearby vehicle.

* * * * *